United States Patent Office 2,807,632
Patented Sept. 24, 1957

2,807,632
HYDROXYLATED ERGOSTEROL

Gerald D. Laubach, Jackson Heights, and Eric C. Schreiber, Levittown, N. Y., assignors to Chas. Pfizer & Co., Inc., New York, N. Y., a corporation of Delaware No Drawing. Application March 17, 1954,
Serial No. 416,938

7 Claims. (Cl. 260—397.2)

This invention is concerned with novel steroids which are useful intermediates for therapeutically active compounds, and with a new process for preparing the same. In particular, it is concerned with certain nuclear unsaturated, nuclear hydroxylated steroids. The present application is a continuation-in-part of application Serial No. 249,014, filed on September 29, 1951 by Gerald D. Laubach et al., now abandoned.

Several biologically active corticosteroids possess an oxygen function, generally a keto group, at the 11-position of the C ring of the steroid molecule. In the synthesis of such therapeutic hormones the introduction of this keto group in the nucleus of available steroid starting materials, especially the relatively cheap vegetable-derived steroids, presents many difficulties. Several long and tedious procedures have been developed for the purpose, but yields are often very low and the reagents used are costly. A copending application (Serial No. 248,091 filed on September 24, 1951 by Gerald D. Laubach) teaches that steroid compounds bearing hydroxyl groups at C11 and C14 and at least one double bond in the nucleus at C8—C9 may be prepared by the selective reduction of certain transannular steroid peroxides. For instance, if isodehydroergosteryl acetate peroxide is used as the starting material, it is possible by this method to prepare a steroid having 11- and 14-hydroxyl groups and unsaturated either at both the 6,7- and 8,9-positions or at 8,9 alone.

It has now been found that such steroids, i. e. those having a nuclear double bond at least at the 8,9-position and bearing hydroxyl groups at the 11 and 14 positions, can be readily isomerized to compounds in which the double bond originally at the 8,9-position is shifted to the 8(14)-position and the 14-hydroxyl is shifted to the 9-position. The isomeric products have greatly increased value in the preparation of cortisone, compound F, etc., since the 9,11-dihydroxylation allows conversion with relative ease to the desired 11-keto compounds.

The novel process whereby these 8(14)-unsaturated, 9,11-dihydroxylated steroids are prepared broadly comprise digesting an 8,9-unsaturated 11,14-dihydroxylated steroid in an acid. Isomerization results and there is a shift of the 8,9-double bond to the 8(14)-position and of the 14-hydroxyl to the 9-position. These reactions are illustrated by the diagram below. Other double bonds, especially that at C6—C7 present when a starting material like the aforementioned isodehydroergosteryl acetate peroxide is used, are not affected by the treatment. The reason for this strange selectivity is not presently understood.

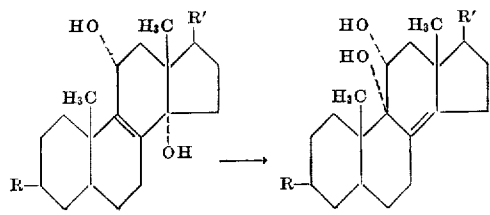

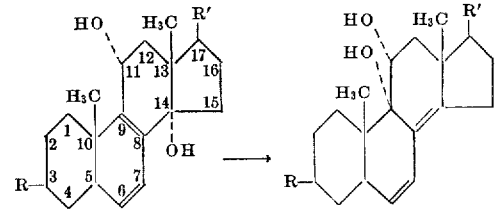

The above formulae represent certain preferred reactants and products where R is a hydroxyl group or a group readily hydrolyzable to hydroxyl and R' is chosen from the class consisting of alkyl, alkenyl, $CH_3C=O$, $CH_3CHCOO$ alkyl, $CH_3C=CH$ acyl and groups attached at two points of the D ring, viz.

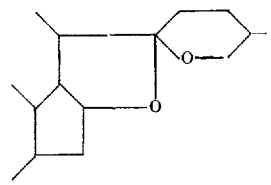

(such as is present in certain naturally occurring vegetable steroids). As examples of such novel products may be mentioned ergosta-8(14), 22-diene-3,9,11-triol-3 esters and ergosta-6,8(14),22-triene-3,9,11-triol 3-esters, i. e. where the C3 substituent is an ester group and R' at C17 is the radical

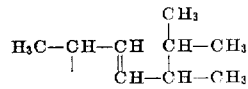

Taking ergosta-6,8(14),22-triene-3,9,11-triol 3-acetate as an example, the following outline will indicate a method of utilizing the products of this invention in the synthesis of cortical hormones. By standard methods, the C17 side chain may be cleaved to give a short chain containing three carbons, as shown in the following equation:

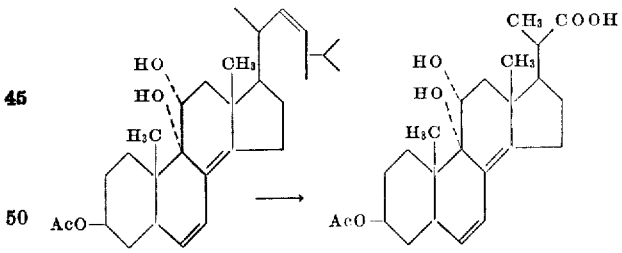

This product may then be treated with hydrogen in the presence of a strong acid and of a noble metal catalyst, according to the method of copending application Serial No. 276,050, filed on March 11, 1952 by Gerald D. Laubach. Nuclear double bonds are thereby saturated and the C9 oxygen function is reduced, while neither the C3 nor the C11 oxygen is attacked. The equation is as follows:

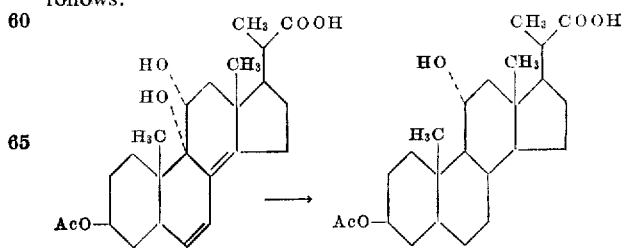

As the critical and difficult to obtain C11 oxygen has been retained intact, the product will be recognized as one which any chemist skilled in the art can readily convert to a therapeutically active cortical steroid by standard methods. For instance, degradation of this last shown compound by the method of Barbier-Wieland affords the well-known cortisone intermediate with the formula

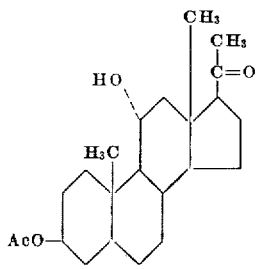

The isomerization of the dihydroxylated steroids may be carried out under a variety of conditions. In general, it is best to effect the acid digestion by means of aqueous solutions containing substantially from 1% to 50% by weight of such inorganic acids as sulfuric acid, hydrochloric acid, hydrobromic acid, phosphoric acid, perchloric acid, and the like. Mineral acids are often preferred by reason of availability and relative cost. When an oxidizing acid like nitric is selected, it is better to utilize a quite dilute solution in order that side reactions may be avoided. Instead of inorganic and particularly mineral acids, organic acids, such as benezene-sulfonic acid, p-toluenesulfonic acid, trichloroacetic acid, oxalic acid, nitrobenzoic acids, trifluoracetic acid, formic acid, acetic acid and so forth may be employed. By "acid" is meant generally one which has an ionization constant of at least about $1.5 \times 10^{-5}$. As is true of most digestion processes the exact proportion of acidic reagent is relatively unimportant. However, most complete isomerization in the shortest practical times is best realized when one part by weight of the steroid is treated with a solution containing from about 0.1 to 20 parts by weight of acid.

When a liquid organic acid is used as the medium for the reaction, e. g. acetic acid, it may be used undiluted. It seems likely that the small proportion of water normally present in such acids, unless prepared by special procedures, is sufficient to allow the normal reaction to proceed.

Although the reaction may be accomplished by merely suspending the steroid compound in an aqueous solution of the chosen acid, the slight solubility of many steroids in aqueous systems will necessarily make this procedure quite slow. To facilitate the reaction, it is better to dissolve the compound in an organic solvent system or in a mixture of solvents and then to add the acid to the solution. The reaction may be conducted in a one-phase system by choice of the proper solvent, or in a two-phase system. One satisfactory solvent is an ether-acetone mixture. Other ethers, lower ketones, lower alcohols and many other recognized solvents may also be used. When the acid solution is especially concentrated, the reaction is preferably operated at about room temperature or somewhat below, e. g. from about 0° C. to about 25° C. However, if more dilute acids are used, the temperature may be raised even as high as the boiling point of the chosen system without detracting from the efficiency of the isomerization. In general the reactions are completed within but a few hours, often in less than an hour. Recovery of the isomeric products is relatively simple and essentially any standard method may be selected. Thus, the acid may be removed and the solution merely concentrated. Where quite dilute acid is used with a suitable solvent, the product will sometimes separate upon simple cooling.

The following examples are given by way of illustration and are not intended as a limitation of this invention. Indeed, as many apparently widely different embodiments of the present invention may be made without departing from the spirit and scope hereof, it is to be understood that the invention is limited as defined in the appended claims only.

EXAMPLE I

*Ergosta-6,8(14),22-triene-3β,9,11-triol 3-acetate*

A solution of 0.300 g. of ergosta-6,8,22-triene-3β,11,14-triol 3-acetate in a mixture of 20 ml. of ether and 10 ml. of acetone was contacted at 0° C. with 6 ml. of 40% sulfuric acid. After being stirred for 2 hours at 0° C., the reaction mixture was diluted with 10 ml. of ice water and 25 ml. of cold ether. The ether layer was separated and the aqueous phase washed with a further 10 ml. portion of ether. This ether wash was added to the first ether layer and the combined organic phase was extracted with ice water and treated with enough saturated sodium bicarbonate solution and water to achieve neutrality. The solution was dried over sodium sulfate, then concentrated under vacuum to a crisp white solid, weighing 0.275 g. Trituration with petroleum ether (B. P. 30–60°) afforded 0.182 g. (62% yield) of the desired 6,8(14)-diunsaturated, 9,11-dihydroxylated ergosterol derivative as a white, crystalline solid.

Recrystallization from methanol yielded an analytical sample as beautiful white needles, melting point 197.8–204.4° C. This product had an ultraviolet absorption maximum of $\epsilon = 26,100$ at 248 m$\mu$.

*Anal.*—Calcd. for $C_{30}H_{46}O_4$: C, 76.65; H, 9.86. Found: C, 76.98; H, 10.10.

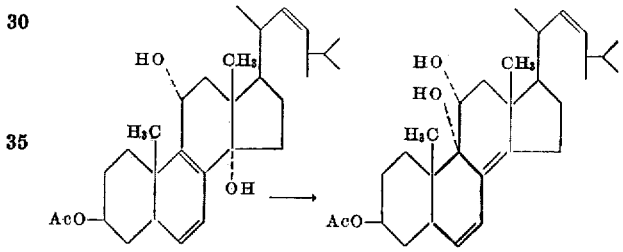

EXAMPLE II

*Ergosta-6,8(14),22-triene-3β,9,11-triol 3-acetate*

A solution consisting of 15 ml. of 0.1 N hydrochloric acid and 25 ml. ethanol, with 0.050 g. of ergosta-6,8,22-triene-3β,11,14-triol 3-acetate dissolved therein, was refluxed for 45 minutes. After cooling, the solution was filtered and concentrated to recover 0.040 g. of grayish crystalline solid. Trituration of the product with petroleum ether (30–60°) yielded 0.030 g. of a white crystalline solid, melting point 181.6–194.8° (60%). Analysis indicated this to be the desired isomer of the initial ergosterol-type reactant. Ultraviolet absorption maximum at 248 m$\mu$ was log $\epsilon = 4.4$.

EXAMPLE III

*Isomerization of ergosta-6,8,22-triene-3β,11,14-triol 3-acetate with acetic acid*

Ergosta-6,8,22-triene-3β,11,14-triol 3-acetate (0.050 g.) was covered with 5 ml. of commercial glacial acetic acid at 10–12° C. After one hour the temperature was raised to 30° and the reaction allowed to continue for 18 hours.

The acetic acid was removed by distillation under vacuum, and the product was triturated with petroleum ether. The white crystalline residue amounted to 0.024 g. (48%) M. P. 200.0–206.0°, ultraviolet absorption maxima-242, 247.5 and 255 m$\mu$ ( log $\epsilon$ max.=4.36).

Recrystallization from either afforded a beautifully crystalline analytical sample, M. P. 201.9–204.9°.

*Anal.*—Calcd. for $C_{30}H_{46}O_4$: C, 76.65; H, 9.85. Found: C, 76.92; H, 9.48.

EXAMPLE IV

The procedure of Example I was repeated, using various ester and ether groups in the 3 position instead of the acetate group present in Example I. Useful groups include, for example, formate, propionate and benzoate among the esters and methyl, ethyl and benzyl among the ethers. The reaction was also carried out with the 3-OH group unprotected. None of these changes in the group at the 3 position had any effect on the overall reaction, and the rearrangemnet took place in exactly the same manner as before.

EXAMPLE V

*Ergosta-8(14),22-diene-3β,9,11-triol 3-acetate*

The procedure of Example I was repeated, using ergosta-8,22-diene-3β,11,14-triol 3-acetate as the starting steroid. The absence of the double bond at the 6 position had no effect on the reaction, and rearrangement took place in the same manner as before. Recovery of product was also accomplished in the same manner. The equation for the reaction of this example is as follows:

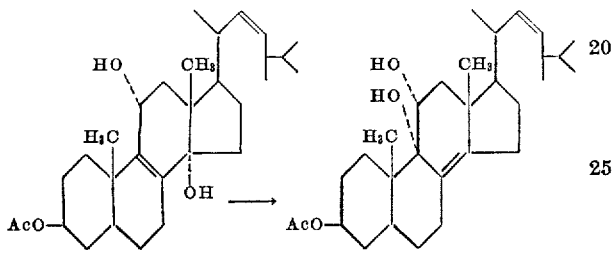

EXAMPLE VI

The procedure of Example V was repeated, using various ester and ether groups in the 3 position instead of the acetate group present in Example V. The groups used included, for example, formate, propionate and benzoate among the esters and methyl, ethyl and benzyl among the ethers. The reaction was also carried out with the 3-OH group unprotected. None of these changes in the group at the 3 position had any effect on the overall reaction, and the rearrangement took place in exactly the same manner as before.

What is claimed is:

1. A process for isomerizing an 8,9-unsaturated, 11,14-dihydroxylated ergosterol substituted at the C-17 position by the group

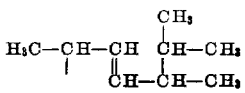

to the corresponding 8(14)-unsaturated, 9,11-dihydroxylated ergosterol, which process comprises digesting the former in an acid.

2. A process according to claim 1 wherein the acid is an aqueous solution of a mineral acid.

3. A process for isomerizing an 8,9-unsaturated, 11,14-dihydroxylated ergosterol compound substituted at the C-17 position by the group

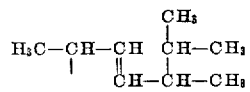

to the corresponding 8(14)-unsaturated, 9,11-dihydroxylated steroid compound, which process comprises dissolving the former in an organic solvent system and contacting the solution with an aqueous solution containing substantially between 1% and 50% by weight of a strong acid, at a temperature of from about 0° C. to about the boiling point of the reaction mixture.

4. A process according to claim 3 wherein the ergosterol reactant is also unsaturated at the 6,7-position.

5. A steroid compound having the formula

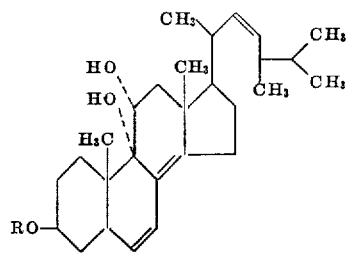

where R is selected from the class consisting of hydrogen carboxylic acid acyl group containing from 1 to 7 carbon atoms.

6. A steroid compound having the formula

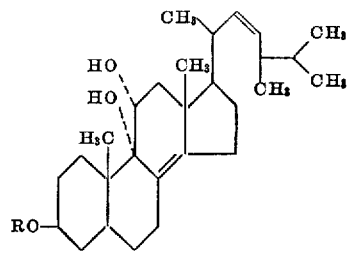

where R is selected from the class consisting of hydrogen and a hydrocarbon carboxylic acid acyl group containing from 1 to 7 carbon atoms.

7. 8(14)-unsaturated, 9,11-dihydroxylated ergosterol substituted at the C-17 position by the group

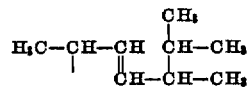

References Cited in the file of this patent

Laubach et al.: Journal Am. Chem. Soc. 75 1514–1515 (1953).

U. S. DEPARTMENT OF COMMERCE
PATENT OFFICE
CERTIFICATE OF CORRECTION

Patent No. 2,807,632

September 24, 1957

Gerald D. Laubach et al.

It is hereby certified that error appears in the printed specification of the above numbered patent requiring correction and that the said Letters Patent should read as corrected below.

Column 6, line 29, before "carboxylic" insert -- and a hydrocarbon --.

Signed and sealed this 4th day of March 1958.

(SEAL)
Attest:

KARL H. AXLINE
Attesting Officer

ROBERT C. WATSON
Commissioner of Patents